3,574,790
POLYSTYRENE COMPOSITION OF SUPPRESSED ELECTROSTATIC ACCUMULATION TENDENCIES
David W. Young, Homewood, Ill., and Henry V. Isaacson, Minnneapolis, Minn., assignors to Sinclair Research, Inc., New York, N.Y.
No Drawing. Filed Dec. 7, 1967, Ser. No. 688,689
Int. Cl. C08f 7/04, 33/08
U.S. Cl. 260—874           6 Claims

ABSTRACT OF THE DISCLOSURE

A polystyrene composition in which electrostatic charges are suppressed which comprises polystyrene and an amount, sufficient to suppress the accumulation of electrostatic charges, e.g. about 0.05 to 0.5 wt. percent, based on the polystyrene, of a copolymer of styrene and maleic anhydride having a ratio of styrene to maleic anhydride of about 1 to 4:1 and a molecular weight of about 700 to 8,000.

---

This invention relates to an improved method for preventing the accumulation of electrostatic charges on synthetic resins. More particularly this invention relates to an improved method for preventing the accumulation of electrostatic charges on polystyrene.

It is well known that articles manufactured from synthetic resins have a tendency to accumulate electrostatic charge especially under friction conditions. Certain synthetic resins manifest this tendency to a degree much greater than others. The problem of static electricity in synthetic resins is very serious and much effort has been devoted to eliminating or reducing the magnitude of accumulated electrostatic charges. The problem is manifested in contamination and dust accumulation on articles made from the synthetic resins and in annoying shocks and sometimes dangerous sparks from articles formed from the synthetic resins. These difficulties arise not only in the service life of the formed synthetic resin compositions, such as sheets, cast and molded articles, but also during the manufacture of such articles which can result in a slow down in production, waste and hazards of explosions.

Articles comprising synthetic resins tend to accumulate electrostatic charges during manufacture, treatment and use. These accumulated electrostatic charges are troublesome in that not only do they render the articles more difficult to handle during manufacture and treatment, but also in that they greatly increase the tendency of the finished articles to accumulate unwelcome dust in use.

Many methods have been proposed to prevent the accumulation of static charges, none of which is entirely satisfactory. External methods such as temperature and humidity control, and dipping into aqueous surface-active agent solutions have been employed in production operations, but antistatic protection thereby is temporary and exists only when the synthetic resins are exposed to such condition.

A great number of agents have also been proposed for treating the surface of synthetic resins to prevent the generation or accumulation of electrostatic charges. However, such treatments are generally temporary in nature since these agents are removed by washing, leaching or abrasion.

All surface treatment methods, however, require additional handling of the articles formed from the synthetic resins during such treatment. This is generally undesirable from a production handling viewpoint and undesirable to the ultimate user if repeated applications are necessary. While such a surface treatment is effective, static protection of the articles is removed with washing or contact with water because of the high water solubility of the surface active agents.

It is also known that antistatic agents can be compounded into the synthetic resins. Such incorporation of the antistatic agent into the synthetic resin is generally superior to any surface treatment or coating because of the permanency achieved. An antistatic agent for internal use in synthetic resins, as opposed to an external coating, must fulfill certain special requirements beginning with sufficient activity to give adequate antistatic effect at practical concentration levels. The agent must also be of a nature such that it can be quickly and uniformly incorporated into the synthetic resin during the compounding step, and, desirably, it should not impart color to the substrate. The antistatic agent also should not sweat out or extrude to the surface of the synthetic resin. Various antistatic agents have been proposed for use. However, antistatic agents which are effective when applied by normal coating methods, are not satisfactory for internal use, since during processing under necessarily high temperatures, they decompose and may cause or catalyze decomposition of the synthetic resin, resulting in undesirable darkening, or even complete discolorization of the synthetic resin.

In accordance with the present invention, it has been found that electrostatic generating tendencies of solid polystyrene resins can be suppressed by incorporating copolymers of styrene and maleic anhydride in the polystyrene. These copolymers of styrene and maleic anhydride when distributed substantially throughout the polystyrene have been found to give antistatic protection which is substantially permanent for the service life of the articles made from the polystyrene. It has also been found that these copolymers of styrene and maleic anhydride do not sweat out or extrude to the surface of the articles made from polystyrene and are not leached out by exposure to water.

These copolymers of styrene and maleic anhydride are effective when used in a small amount sufficient to suppress the accumulation of electrostatic charges. For most applications, amounts of about 0.05 to 1 wt. percent, preferably 0.05 to 0.5 wt. percent, based on the polystyrene are effective, although a greater amount can be employed. The optimum concentration of antistatic agent is dependent upon the degree of static elimination desired. No undesirable changes in physical properties of the polystyrene are noticed when the antistatic agents are employed within these preferred limits. The polystyrene can, after the incorporation of the antistatic agents, be formed in any desired shape such as sheet, film, filament, or into cast or molded articles.

The polystyrene into which these antistatic agents may be incorporated can also contain other materials such as dyes, pigments, fillers, plasticizers, lubricants, and the like without adversely affecting the effectiveness of these antistatic agents. These products can be incorporated into the polystyrene during any stage of its preparation or by compounding with the polystyrene before the forming operation.

The copolymers of styrene and maleic anhydride can be prepared by known methods. A preferred method is by solution polymerization where the monomers are polymerized in a suitable solvent employing as a polymerization catalyst a free-radical catalyst, such as a peroxide, preferably benzoyl peroxide, dicumyl peroxide or an alkyl peroxy dicarbonate, at a temperature of about 75 to 300° C. or more. Suitable solvents include the aromatic hydrocarbon solvents, such as cumene, p-cumene, xylene, toluene, etc. Other suitable solvents are the ketones, such as methyl ethyl ketone. The preferred manner of carrying out the polymerization is by what is known as incremental feed addition. By this method the monomers and catalyst are first dissolved in a portion of the solvent in which the polymerization is to be conducted and the resulting solution is fed in increments into a reactor containing solvent heated to reaction temperature, usually the reflux temperature of the mixture.

When an aromatic solvent is employed as the solvent for the polymerization, the formation of the copolymer produces a heterogeneous system, the polymer layer being the heavier layer and recoverable by merely decanting the upper aromatic solvent layer and drying. On the other hand, when a ketone is the solvent, the formed copolymer is usually soluble in the solvent media so that recovery of the product necessitates a solvent-stripping operation. Styrene and maleic anhydride are copolymerized in a molar ratio of styrene to maleic anhydride of about 1 to 4:1, preferably about 1 to 3:1. The resulting copolymer can have a molecular weight of about 700 to 8,000, preferably about 1200 to about 2600, and often has a melting point of about 50° C. to 170° C.

EXAMPLE I

Commercial injection molding polystyrene having a molecular weight of about 90,000 to 100,000 and 0.1 wt. percent, based on the polystyrene, of a copolymer of styrene and maleic anhydride having a ratio of styrene to maleic anhydride of about 2:1 and a molecular weight of about 1600 were compounded on a rubber mill. Samples were prepared using both unpigmented (transparent) and $TiO_2$ pigmented (white) polystyrene. A sample of unpigmented polystyrene of the same molecular weight and 0.1 wt. percent, based on the polystyrene, of vinyl pyridine were compounded in the same manner on a rubber mill. Vinyl pyridine has been used as an antistatic agent in synthetic resins and this sample was used as a control along with polystyrene samples containing no antistatic agent. The working temperatures were usually equal to, or somewhat higher than, that generally used for polystyrene. The control samples of polystyrene were milled and mixed at the same temperature, for the same length of time, and with the same degree of working as the polystyrene samples containing a copolymer of styrene and maleic anhydride. The physical properties such as tensile, impact, hardness, etc. of the polystyrene samples containing a copolymer of styrene and maleic anhydride were essentially the same as those of the control samples of polystyrene and there was no alteration in physical properties by compounding copolymers of styrene and maleic anhydride with polystyrene resins.

The polystyrene compounds were injection molded into samples of disk form with a diameter of 100 mm. and a thickness of 4 mm. The samples were dried at 40° C. under vacuum over phosphorous pentoxide to constant weight. They wer then transferred to a room at 25° C. and 50 percent relative humidity and conditioned up to constant weight, that is, until they reached equilibrium with the relative humidity which required approximately two weeks. The measurements were carried out by spraying the specimen with dust formed by zinc stearate and carbon black and observing the way in which the dust deposited. The tests were performed by using dust which had been previously dried over phosphoric anhydride at 50 percent relative humidity. It is known that the formation of dust designs of crow's-feet indicate high charge, whereas dust spots indicate medium charge and diffused dust indicates low charge. If a design is observed carefully, it is possible to detect greater or lesser charges. For example, the presence of few crow's-feet with net contours shows a very high charge. In order to insure greater reproducibility, the specimens were previously discharged with a humid rug and then rubbed with a rotating disk covered by a wool rug. The rug was discharged before every test. The specimen was held against the rug by a spring with constant rubbing pressure. Rubbing lasted 10 seconds and the rubbing disc rotated at a speed of about 1,450 r.p.m. Readings were taken 45 seconds after rubbing. In general, it can be said that high charges are indicated by strong circular dust orientation and a few crow's-feet. Medium charges are indicated by oriented dust spots or smudges and low charges by diffused dust with very low or no dust orientation or smudges. A sample which does not attract dust may be considered as having very good antistatic properties.

The antistatic properties of the various samples tested are contained in Table I below.

TABLE I

Antistatic properties of polystyrene

| | |
|---|---|
| Polystyrene, unpigmented | Very high static charge. |
| Polystyrene, pigmented [1] | Do. |
| Polystyrene, unpigmented—0.1 wt. percent copolymer of styrene and maleic anhydride [2] | No static charge. |
| Polystyrene, pigmented [1]—0.1 wt. percent copolymer of styrene and maleic anhydride [2] | Do. |
| Polystyrene, unpigmented—0.1 wt. percent vinyl pyridine (control) | Slight static charge. |
| Polystyrene, unpigmented—0.1 wt. percent copolymer of styrene and maleic anhydride [2]—sample immersed in 10 wt. percent aqueous ammonia solution for 7 days prior to test | No static charge. |

[1] Pigmented with $TiO_2$.
[2] Copolymer of styrene and maleic anhydride having a ratio of styrene to maleic anhydride of about 2:1 and a molecular weight of about 1600.

As shown in Table I above, the pigmented and unpigmented polystyrene samples containing the copolymer of styrene and maleic anhydride showed excellent antistatic properties while the pigmented and unpigmented polystyrene samples containing no antistatic agent showed very poor antistatic properties. The copolymer of styrene and maleic anhydride was superior to vinyl pyridine as an antistatic agent in polystyrene.

The immersion of a polystyrene sample containing a copolymer of styrene and maleic anhydride in a 10 wt. percent aqueous ammonia solution for 7 days with no loss of antistatic properties shows the permanency of the antistatic properties produced by the compounding of a copolymer of styrene and maleic anhydride in polystyrene.

It is claimed:

1. A solid polystyrene composition wherein electrostatic charges are suppressed comprising polystyrene having therein a small amount, sufficient to suppress the accumulation of electrostatic charges of a copolymer consisting of styrene and maleic anhydride having a molar ratio of styrene to maleic anhydride of about 1 to 4:1 and a molecular weight of about 700 to 8,000.

2. The composition of claim 1 wherein the copolymer consisting of styrene and maleic anhydride is present in an amount of about 0.05 to 0.5 wt. percent based on the polystyrene.

3. The composition of claim 1 wherein the copolymer consisting of styrene and maleic anhydride has a molecular weight of about 1200 to 2600 and a molar ratio of styrene to maleic anhydride of about 1 to 3:1.

4. The composition of claim 2 wherein the copolymer consisting of styrene and maleic anhydride has a molar ratio of styrene to maleic anhydride of about 2:1 and a molecular weight of about 1600.

5. The composition of claim 1 wherein the copolymer consisting of styrene and maleic anhydride is present in an amount of about 0.05 to 1 wt. percent based on the polystyrene.

6. The composition of claim 5 wherein the copolymer consisting of styrene and maleic anhydride has a molar ratio of styrene to maleic anhydride of about 2:1 and a molecular weight of about 1600.

References Cited

UNITED STATES PATENTS

| | | | |
|---|---|---|---|
| 2,912,413 | 11/1959 | Baer | 260—874X |
| 2,945,839 | 7/1960 | Blanchette | 260—63 |
| 3,268,489 | 8/1966 | Dial | 260—78.5 |

FOREIGN PATENTS

| | | | |
|---|---|---|---|
| 776,278 | 6/1957 | Great Britain | 260—874 |

MURRAY TILLMAN, Primary Examiner

H. ROBERTS, Assistant Examiner

U.S. Cl. X.R.

260—78.5, 93.5